No. 726,295. PATENTED APR. 28, 1903.
W. A. HOYT.
BEARING FOR SHAFTS OR JOURNALS.
APPLICATION FILED MAY 14, 1902.
NO MODEL. 2 SHEETS—SHEET 1.
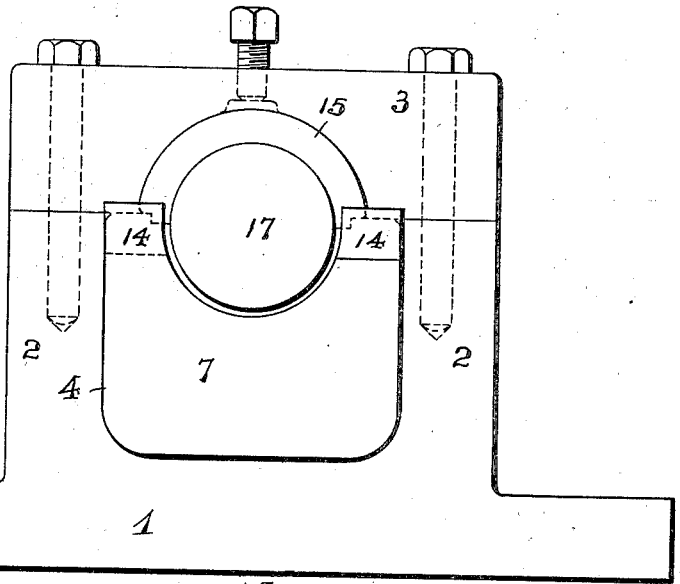
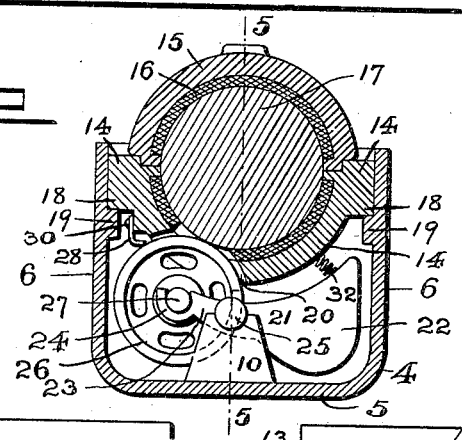
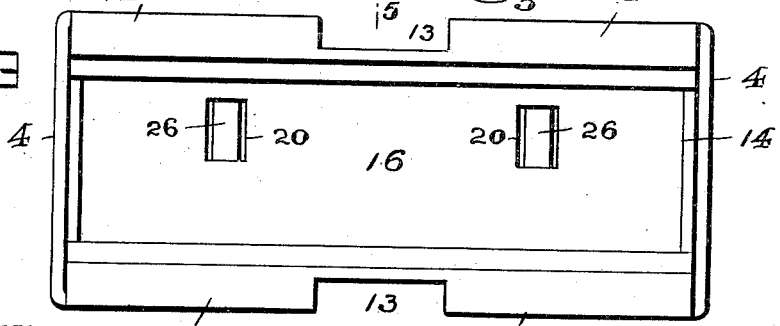
WITNESSES: Geo. L. Richards. Susan Blewett.
INVENTOR: William A. Hoyt,
BY Fred L. Fraentzel,
ATTORNEY No. 726,295.  
PATENTED APR. 28, 1903.
W. A. HOYT.  
BEARING FOR SHAFTS OR JOURNALS.  
APPLICATION FILED MAY 14, 1902.
NO MODEL.  
2 SHEETS—SHEET 2.
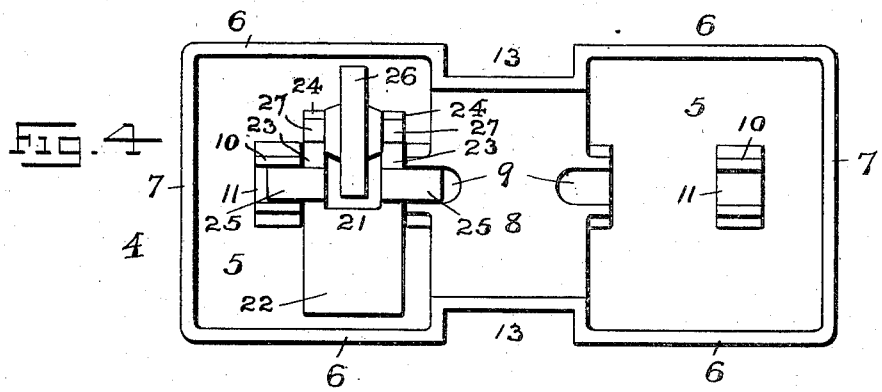
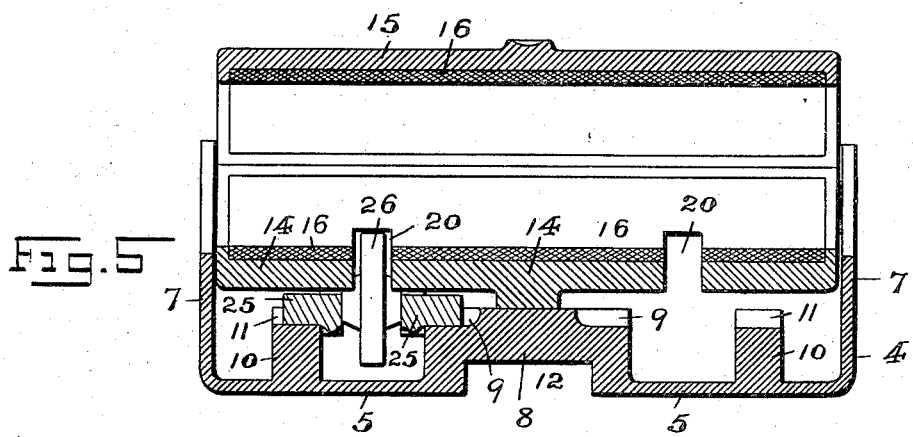
WITNESSES:  
INVENTOR:  
William A. Hoyt,  
BY  
Fred L. C. Fraentzel,  
ATTORNEY

UNITED STATES PATENT OFFICE.

WILLIAM A. HOYT, OF NEWARK, NEW JERSEY, ASSIGNOR OF ONE-HALF TO RUDOLPH G. SALOMON, OF NEWARK, NEW JERSEY.

BEARING FOR SHAFTS OR JOURNALS.

SPECIFICATION forming part of Letters Patent No. 726,295, dated April 28, 1903.

Application filed May 14, 1902. Serial No. 107,250. (No model.)

*To all whom it may concern:*

Be it known that I, WILLIAM A. HOYT, a citizen of the United States, residing at Newark, in the county of Essex and State of New Jersey, have invented certain new and useful Improvements in Bearings for Shafts or Journals; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

The present invention relates principally to improvements in bearings for shafts, journals, and the like and is adaptable to journal-boxes for cars or to that class of pillow-blocks and other bearings which are provided with a chambered base provided with a suitable means for supporting the same and in which case the bearing-block for the journal or shaft is arranged and held in its operative position.

My invention has for its primary object to provide a novel, simple, and efficient means of lubrication for distributing the lubricant upon the cylindrical surface of a journal or shaft at a point or points somewhat higher than the lowest point of the cylindrical surface of said journal or shaft, so that the surface of the journal or axle will be thoroughly and constantly lubricated during the revolutions of the journal or shaft and when not in rotation a portion of the cylindrical surface of the journal or shaft still being provided with an application of lubricant, so that when the journal or shaft is set in motion it is well lubricated at the start.

A further object of the invention is to provide in connection with a case containing a lubricant and a journal or bearing supported in said case a lightly-running and perfectly-balanced roll or rollers which runs in the said lubricant and feeds the same through an opening or openings in the lower portion of the bearing-box, the said opening or openings being to one side of a vertical plane through the longitudinal central axis of the box and the journal or shaft therein, so that the lubricant will be fed upon the journal or shaft at a point above the lowest surface of the journal or shaft.

The present invention therefore consists in the novel bearing for journals, shafts, and the like, to be hereinafter more fully set forth, and, furthermore, the invention consists in the various novel arrangements and combinations of parts, all of which will be more particularly described in the accompanying specification and then finally embodied in the clauses of the claim.

The invention is clearly illustrated in the accompanying drawings, in which—

Figure 1 is an end view of a bearing for a shaft made according to the principles of the present invention, illustrating one application of my invention to a pillow-block, said block being represented in side elevation. Fig. 2 is a vertical cross-section of my novel construction of bearing and a shaft or journal, said view illustrating the general arrangement of the case in which the lubricant is to be arranged, the bearing-box and the lubricant-feeding means arranged within the said case. Fig. 3 is a plan view of the lower section or half of the bearing-box and the lubricant-casing in which said section is supported, said view illustrating an arrangement of two openings in the body of said lower section or half of the bearing-box, through which portions of the peripheral surfaces of a pair of rollers of the said lubricant-feeding means extend. Fig. 4 is a top or plan view of the supporting-case in which the lubricant is to be placed, illustrating in connection therewith certain bearings for a pair of balanced lubricant-feeding rolls, one of the said balanced rolls being represented in plan in its operative position in said case. Fig. 5 is a longitudinal vertical section taken on line 5 5 in Fig. 2. Fig. 6 is a perspective view of one of the balanced cradles in which the lubricant-feeding rolls or wheels are arranged, and Fig. 7 is a face view of a self-adjusting scraper which is employed with the said lubricant-feeding rolls or wheels.

Similar characters of reference are employed in all of the said above-described views to indicate corresponding parts.

In the present drawings, 1 indicates the base of any suitable form of pillow-block, the same comprising the lower block-section 2 and upper block-section 3, which are arranged about the case and bearing-box of my novel form of bearing, to be presently described, and secured about the said parts substantially in the manner illustrated in said Fig. 1 of the drawings.

The case, which is adapted to contain a lubricant, is indicated by the reference character 4, and the same comprises, as will be seen from an inspection of the several figures of the drawings, a base 5, a pair of longitudinal sides 6, and the ends 7. Cast integral with or secured in any suitable manner upon the inner surface of the said base 5 is a block or enlargement 8, having a pair of depressions or recesses 9. Upon the said inner surface of the said base 5 are a pair of other blocks, 10, each block being made with a depression or recess 11, substantially as illustrated, and all of said depressions or recesses 9 and 11 being in alinement with one another, as will be evident from an inspection of Fig. 4 of the drawings. The said casing 4 is made across the lower surface of its base 5 with a squared receiving depression 12, as represented in Fig. 5, and in its opposite sides 6 with similar depressions 13, in which the holding members or portions of the lower pillow-block section 2 and the base 1 are arranged to properly hold the said casing 4 in its position for the reception of the parts of the bearing-box in the manner to be presently described. The said bearing-box comprises a lower box section or member 14 and an upper box section or member 15, both of which may be lined upon their inner surfaces with "Babbitt" metal 16, as clearly illustrated, and which are placed upon each other and about the shaft or journal 17 in the usual manner. The lower box section or member 14 is made with the longitudinally-extending stepped portions 18, which rest directly upon correspondingly-placed ribs 19, extending from the inner surfaces of the sides 6 of the casing 4, and whereby a close fit or tight lock is provided, as indicated in Fig. 2 of the drawings, to prevent any oozing out of the lubricant between the joints when the shaft or axle 17 is set in motion.

The lubricating means connected with the bearing for bringing the lubricant from the casing 4 to the cylindrical surface of the shaft or journal 17, through one or more openings 20 in the lower box section or member 14, consists, essentially, of one or more lubricating wheel or roller supporting cradles 21. Each cradle 21 is preferably made as shown in Fig. 6 of the drawings and comprises a weighted end member 22, from which extend a pair of arms or fingers 23, each finger being made at its free end with a hook-shaped receiving portion or bearing member 24. Between each bearing member 24 of each arm or finger 23 and the weighted end member 22 each arm is provided with a laterally-extending journal 25, by means of which the cradle can be suspended from the respective depressions 9 and 11 of the respective blocks 8 and 10, between which the cradle is capable of an oscillating or rocking motion when suspended in this manner. The two arms or fingers 23 of each cradle 21 have an open space between them, and rotatively arranged in the said space is a suitable wheel or roller 26, provided with the oppositely-extending journals 27, which are loosely and rotatively arranged in the said hooked-shaped receiving portions or bearing members 24 of the arms or fingers 23. When the cradle 21 and the roller or wheel 26 have been arranged in their suspended relation in the bearing-blocks 8 and 10 in the case 4, then the weighted end members 22 of the cradle will sufficiently counterbalance the weight of the wheel or roller 26 and the arms or fingers 23, whereby a part of the cylindrical surface of the said wheel or roller 26 is made to project through the opening 20 in the lower box section or member 14 of the main bearing-box and is brought in rolling contact with the cylindrical surface of the shaft or journal 17, as clearly illustrated in Fig. 2 of the drawings. From an inspection of the said Fig. 2 it will be clearly evident that when the said shaft or journal 17 is set in motion the frictional contact between the rolling surfaces of the shaft or journal 17 and the wheel or roller 26, which latter wheel or roller rotates directly in the oil or other lubricant in the case 4, will set the said wheel or roller 26 in motion, and thereby constantly carry the liquid lubricant to the outer surface of the shaft or journal 17, and that, too, at a point above the lowest surface portion of the said shaft or journal 17. The lubricant is thus made to spread itself over the surface of the said shaft or journal, and the latter is well lubricated at the start of its motion and is also constantly kept lubricated while in operation.

The counterbalance 22 of the cradle is of such weight that the pressure of the wheel or roller 26 against the shaft or journal 17 is very slight, so as to cause but a trifling wear of the parts; but it is sufficient to carry the lubricant from the case 4 directly to the shaft or journal 17.

It will be understood that I may use with the lower box section or member 14 any suitable number of openings 20 and that the case 4 may be provided with correspondingly-placed bearing-supports 9 and 10 for the support of any suitable number of cradles 21 and lubricating wheels or rollers 26, which convey the lubricant contained in the case 4 through the several openings 20 to the surface of the shaft or journal 17, as will be clearly evident.

In order that the rolling surface of the wheels or rollers 26 may be kept free from grit and dirt that may be contained in the oil and also to prevent any thick oil from being carried to the shaft or journal 17, the said lower box section or member 14 may have suspended therefrom in front of each opening 20 a wiper or scraper 28. This wiper or scraper is movably connected with the box section or member by having a slotted portion 29 arranged over a pin or screw 30, as clearly indicated in Fig. 7 of the drawings, whereby a series of closely-arranged wiping or scraping fingers 31, which are preferably curved, as shown, will readily adapt themselves to any vibratory movements of the wheel or roller 26 while in the rapid rolling engagement or contact with the cylindrical surface of the shaft or journal 17. When the self-lubricating device is to be used with car-axles where there is a great vibratory action, a suitable spring 32 may be placed between the lower surface of the bearing-box section 14 and the upper surface of the weighted end 22 of the cradle 21, as shown in Fig. 2, whereby the possibility of the displacement of the cradle and any extraordinary rocking motion of the cradle and feeding-roller 26 is overcome.

From the hereinabove description of my invention it will be clearly seen that I have devised a simple means for the transmission of the lubricant from its place of storage to a point above the bottom of the lower box or bearing section, whereby the lubricant is distributed more readily and more successfully to the surface of the shaft or journal, so that as soon as the shaft or journal is set in motion it is well lubricated at the start.

I am aware that changes may be made in the various arrangements and combinations of the parts without departing from the scope of my present invention. Hence I do not limit my invention to the exact arrangements and combinations of the parts as described in the previous specification and as illustrated in the accompanying drawings, nor do I confine myself to the exact details of the construction of the said parts.

Having thus described my invention, what I claim is—

1. In a bearing for journals and shafts, a chambered case adapted to contain a lubricant, a bearing-box for the journal or shaft in said case, said bearing-box having an opening, and a lubricant-conveying wheel in said case, said wheel being arranged to have an oscillating or rocking motion within said case and having a part extending through said opening in rolling contact with the surface of said shaft or journal, and the said opening in the bearing-box being located at a point above the bottom of said box and to one side of the vertical plane through the longitudinal central axis of said box, substantially as and for the purpose set forth.

2. In a bearing for journals or shafts, a chambered case adapted to contain a lubricant, a bearing-box for the journal or shaft in said case, said bearing-box having an opening, and a lubricant-conveying wheel in said case, said wheel being arranged to have an oscillating or rocking motion within said case and having a part extending through said opening in rolling contact with the surface of said shaft or journal, and the said opening in the bearing-box being located at a point above the bottom of said box and to one side of the vertical plane through the longitudinal central axis of said box, and a wiping device on said bearing-box having a portion in wiping contact with the rolling surface of said wheel, substantially as and for the purpose set forth.

3. In a bearing for journals and shafts, a chambered case adapted to contain a lubricant, a bearing-box for the journal or shaft in said case, said bearing-box having an opening in the same, and a lubricant-conveying wheel having a part extending through said opening in rolling contact with the surface of said shaft or journal, and the said opening in the bearing-box being located at a point above the bottom of said box and to one side of the vertical plane through the longitudinal central axis of said box, substantially as and for the purpose set forth.

4. In a bearing for journals and shafts, a chambered case adapted to contain a lubricant, a bearing-box for the journal or shaft in said case, said bearing-box having an opening in the same, and a lubricant-conveying wheel having a part extending through said opening in rolling contact with the surface of said shaft or journal, and the said opening in the bearing-box being located at a point above the bottom of said box and to one side of the vertical plane through the longitudinal central axis of said box, and a wiping device on said bearing-box having a portion in wiping contact with the rolling surface of said wheel, substantially as and for the purpose set forth.

5. In a bearing for journals and shafts, a chambered case adapted to contain a lubricant, a bearing-box for the journal or shaft in said case, said bearing-box having an opening, a rock-cradle in said case, and a lubricant-conveying wheel on said rock-cradle, said wheel having a part extending through said opening in the bearing-box in rolling contact with the surface of said shaft or journal, and the said opening in the bearing-box being located at a point above the bottom of said box and to one side of the vertical plane through the longitudinal central axis of said box, substantially as and for the purpose set forth.

6. In a bearing for journals and shafts, a chambered case adapted to contain a lubricant, a bearing-box for the journal or shaft in said case, said bearing-box having an opening, a rock-cradle in said case, and a lubricant-conveying wheel on said rock-cradle, said wheel having a part extending through said opening in the bearing-box in rolling contact with the surface of said shaft or journal, and the said opening in the bearing-box being located at a point above the bottom of said box and to one side of the vertical plane through the longitudinal central axis of said box, and a wiping device on said bearing-box having a portion in wiping contact with the rolling surface of said wheel, substantially as and for the purpose set forth.

7. In a bearing for journals and shafts, a chambered case adapted to contain a lubricant, a bearing-box for the journal or shaft in said case, said bearing-box having an opening, a rock-cradle in said case, comprising, a weighted end member, a pair of arms, and a hook-shaped bearing portion on each arm, and a lubricant-conveying wheel journaled in said hook-shaped bearing portions so as to be rotatably arranged between said arms, and said wheel having a part extending through said opening in the bearing-box in rolling contact with the surface of said shaft or journal, and the said opening in the bearing-box being located at a point above the bottom of said box and to one side of the vertical plane through the longitudinal central axis of said box, substantially as and for the purpose set forth.

8. In a bearing for journals and shafts, a chambered case adapted to contain a lubricant, a bearing-box for the journal or shaft in said case, said bearing-box having an opening, a rock-cradle in said case, comprising, a weighted end member, a pair of arms, and a hook-shaped bearing portion on each arm, and a lubricant-conveying wheel journaled in said hook-shaped bearing portions so as to be rotatably arranged between said arms, and said wheel having a part extending through said opening in the bearing-box in rolling contact with the surface of said shaft or journal, and the said opening in the bearing-box being located at a point above the bottom of said box and to one side of the vertical plane through the longitudinal central axis of said box, and a wiping device on said bearing-box having a portion in wiping contact with the rolling surface of said wheel, substantially as and for the purpose set forth.

9. The herein-described bearing for journals and shafts, comprising, a chambered case adapted to contain a lubricant, a bearing-box for the journal or shaft, in said case, said bearing-box having an opening, a pair of bearing-posts in said case provided with receiving-recesses, a cradle having journals arranged in said recesses, and a lubricant-feeding wheel supported in said cradle, said wheel having a portion extending through said opening in the bearing-box in rolling contact with the surface of said shaft or journal, and the said opening in the bearing-box being located at a point above the bottom of said box and to one side of the vertical plane through the longitudinal central axis of said box, substantially as and for the purpose set forth.

10. The herein-described bearing for journals and shafts, comprising, a chambered case adapted to contain a lubricant, a bearing-box for the journal or shaft in said case, said bearing-box having an opening, a pair of bearing-posts in said case provided with receiving-recesses, and a cradle, consisting, essentially, of a weighted end member, a pair of forwardly-extending arms connected therewith, a hook-shaped bearing portion on each arm and a journal extending from the side of each arm by means of which the cradle is supported between said bearing-posts of the case, and a lubricant-feeding wheel arranged between said arms and having oppositely-extending journals arranged in the said hook-shaped bearings of said arms, said wheel having a part extending through the opening in the bearing-box in rolling contact with the surface of said shaft or journal, and the said opening in the bearing-box being located at a point above the bottom of said box and to one side of the vertical plane through the longitudinal central axis of said box, substantially as and for the purpose set forth.

In testimony that I claim the invention set forth above I have hereunto set my hand this 28th day of April, 1902.

WILLIAM A. HOYT.

Witnesses:
   FREDK. C. FRAENTZEL,
   GEO. D. RICHARDS.